United States Patent
Zhao et al.

(10) Patent No.: US 8,836,622 B2
(45) Date of Patent: Sep. 16, 2014

(54) DATA LINE REPAIR APPARATUS AND METHOD THEREOF

(75) Inventors: Dengxia Zhao, Shenzhen (CN); Poshen Lin, Shenzhen (CN)

(73) Assignee: Shenzhen China Star Optoelectronics Technology Co., Ltd, Shenzhen (CN)

( * ) Notice: Subject to any disclaimer, the term of this patent is extended or adjusted under 35 U.S.C. 154(b) by 433 days.

(21) Appl. No.: 13/220,665

(22) Filed: Aug. 29, 2011

(65) Prior Publication Data
US 2012/0149274 A1      Jun. 14, 2012

(30) Foreign Application Priority Data

Dec. 9, 2010    (CN) .......................... 2010 1 0581642

(51) Int. Cl.
*G09G 3/36* (2006.01)

(52) U.S. Cl.
USPC ............................... 345/87; 345/90; 345/212

(58) Field of Classification Search
CPC ..... G09G 3/36; G09G 3/3648; G09G 3/3688; G09G 2330/08
USPC .................................... 345/87–100, 204–215
See application file for complete search history.

(56) References Cited

U.S. PATENT DOCUMENTS

| | | | |
|---|---|---|---|
| 5,751,261 A * | 5/1998 | Zavracky et al. | 345/55 |
| 6,031,247 A | 2/2000 | Lee | |
| 6,121,950 A * | 9/2000 | Zavracky et al. | 345/101 |
| 2007/0195030 A1* | 8/2007 | Huang et al. | 345/87 |
| 2007/0206126 A1 | 9/2007 | Lin et al. | |
| 2009/0167730 A1* | 7/2009 | Kwak et al. | 345/204 |

FOREIGN PATENT DOCUMENTS

| | | |
|---|---|---|
| CN | 1797141 A | 7/2006 |
| CN | 101236738 A | 8/2008 |
| CN | 101419789 A | 4/2009 |

* cited by examiner

*Primary Examiner* — Vijay Shankar
(74) *Attorney, Agent, or Firm* — JMB Davis Ben-David

(57) ABSTRACT

Disclosed are a data line repair apparatus and a method thereof, employed in a LCD panel having a repair line, and a repair operational amplifier coupled to the LCD panel including a first input end, a second input end and an output end, and the output end and the second input end are both coupled to a data line of the LCD panel and the repair line. The data line repair apparatus comprises a receiving module, receiving image data of a present frame from the data line; an acquiring module, acquiring output data corresponding to the image data of the present frame and image data of a former frame from preserved corresponding relationships of the aforesaid data; and an outputting module, outputting a voltage corresponding to the output data acquired by the acquiring module to the first input end in a scheduled period.

15 Claims, 4 Drawing Sheets

DATA LINE REPAIR APPARATUS AND METHOD THEREOF

BACKGROUND OF THE INVENTION

1. Field of the Invention

The present invention generally relates to a data line repair apparatus and a method thereof, and more particularly to data line repair apparatus and a method thereof capable of reducing the RC loading effect of the repair line in the LCD panel and shortening the voltage response time of the repair line.

2. Description of Prior Art

In the process of the LCD panel manufacture, the circumstance of defect metal lines may appear in the circuit on the LCD panel due to conditions of respective process machines, material variations, complexities of the processes or the human errors. For raising the yield rate of the LCD panels, a general countermeasure for repairing the defect line is to utilize the external PCBA (Printed Circuit Board Assembly) in cooperation with the repair operational amplifier (Repair OP) for repairing the defect line and the routing of the repair line crossing around the whole panel width. However, the routing of the repair line has to cross around the whole panel width for connecting the other end of the defect data line, the length of the repair line is longer than the original routing length on the COF (Chip on Film) of the LCD panel. The extra routing length of the repair line with the whole panel width leads to a larger RC loading. Therefore, the voltage response time becomes longer and results in the phenomenon of the uneven display image of the LCD panel.

Consequently, there is a need to provide a data line repair apparatus and a method thereof for solving the existing heat dissipation issues of prior art.

SUMMARY OF THE INVENTION

An objective of the present invention is to provide a data line repair apparatus and a method thereof, employed in a LCD panel having a repair line to reduce the RC loading effect of the repair line and shorten the voltage response time of the repair line by applying the overdrive skill for the repair line. The phenomenon of the uneven display image of the LCD panel due to the larger RC loading of the repair line can be improved.

For realizing the aforesaid objective, the present invention provides a data line repair apparatus, employed in a LCD panel having a repair line, the data line repair apparatus comprising:

a repair operational amplifier, including a first input end, a second input end and an output end, and the output end and the second input end are both coupled to a data line of the LCD panel and the repair line; and an overdrive look up table module, comprising:
  a receiving module, receiving image data of a present frame from the data line;
  an acquiring module, having a mapping table preserving corresponding relationships of image data of a former frame, the image data of the present frame and corresponding output data, and the acquiring module acquires output data corresponding to the image data of the present frame and the image data of the former frame; and
  an outputting module, outputting a voltage corresponding to the output data to the first input end of the repair operational amplifier in a scheduled period; outputting a voltage corresponding to the image data of the present frame to the first input end after the scheduled period.

For realizing the aforesaid objective, the present invention provides another data line repair apparatus, employed in a LCD panel having a repair line, and the data line repair apparatus comprises a repair operational amplifier including a first input end, a second input end and an output end, and the output end and the second input end are both coupled to a data line of the LCD panel and the repair line, the data line repair apparatus comprising:

a receiving module, receiving image data of a present frame from the data line;

an acquiring module, acquiring output data corresponding to the image data of the present frame and image data of a former frame from preserved corresponding relationships of the image data of the former frame, the image data of the present frame and the corresponding output data; and an outputting module, outputting a voltage corresponding to the output data acquired by the acquiring module to the first input end in a scheduled period.

In one embodiment of the data line repair apparatus according to the present invention, the outputting module outputs a voltage corresponding to the image data of the present frame to the first input end of the repair operational amplifier after the scheduled period.

In one embodiment of the data line repair apparatus according to the present invention, the acquiring module further comprises a mapping table for preserving corresponding relationships of the image data of the former frame, the image data of the present frame and the corresponding output data.

In one embodiment of the data line repair apparatus according to the present invention, the receiving module, the acquiring module and the outputting module are integrated in an overdrive look up table module.

In one embodiment of the data line repair apparatus according to the present invention, the overdrive look up table module and the repair operational amplifier are integrated in an integrated circuit.

For realizing the aforesaid objective, the present invention provides a data line repair method, employed in a LCD panel having a repair line, and a repair operational amplifier coupled to the LCD panel including a first input end, a second input end and an output end, and the output end and the second input end are both coupled to a data line of the LCD panel and the repair line, the data line repair method comprising steps of:

receiving image data of a present frame from the data line;

acquiring output data corresponding to the image data of the present frame and image data of a former frame from preserved corresponding relationships of the image data of the former frame, the image data of the present frame and the corresponding output data; and outputting a voltage corresponding to the output data to the first input end in a scheduled period.

Moreover, the data line repair method of the present invention further comprises a step of: outputting a voltage corresponding to the image data of the present frame to the first input end after the scheduled period.

In one embodiment of the data line repair method according to the present invention, the corresponding relationships of the image data of the former frame, the image data of the present frame and the corresponding output data are preserved in a mapping table.

In one embodiment of the data line repair method according to the present invention, the method further comprises steps of:

acquiring the corresponding voltage by a digital-to-analog conversion; and outputting the corresponding voltage acquired with the digital-to-analog conversion to the first input end in the scheduled period during the step of outputting the voltage corresponding to the output data to the first input end.

In one embodiment of the data line repair method according to the present invention, method further comprises steps of:

acquiring the voltage corresponding to the image data of the present frame by a digital-to-analog conversion; and outputting the voltage acquired with the digital-to-analog conversion to the first input end after the scheduled period during the step of outputting the voltage corresponding to the image data of the present frame to the first input end after the scheduled period.

According to the data line repair apparatus and the method of the present invention, the RC loading effect of the repair line of the LCD panel can be reduced and the voltage response time of the repair line can be shortened. Accordingly, the phenomenon of the uneven display image of the LCD panel due to the larger RC loading of the repair line can be improved.

DETAILED DESCRIPTION OF THE INVENTION

Figure 1:
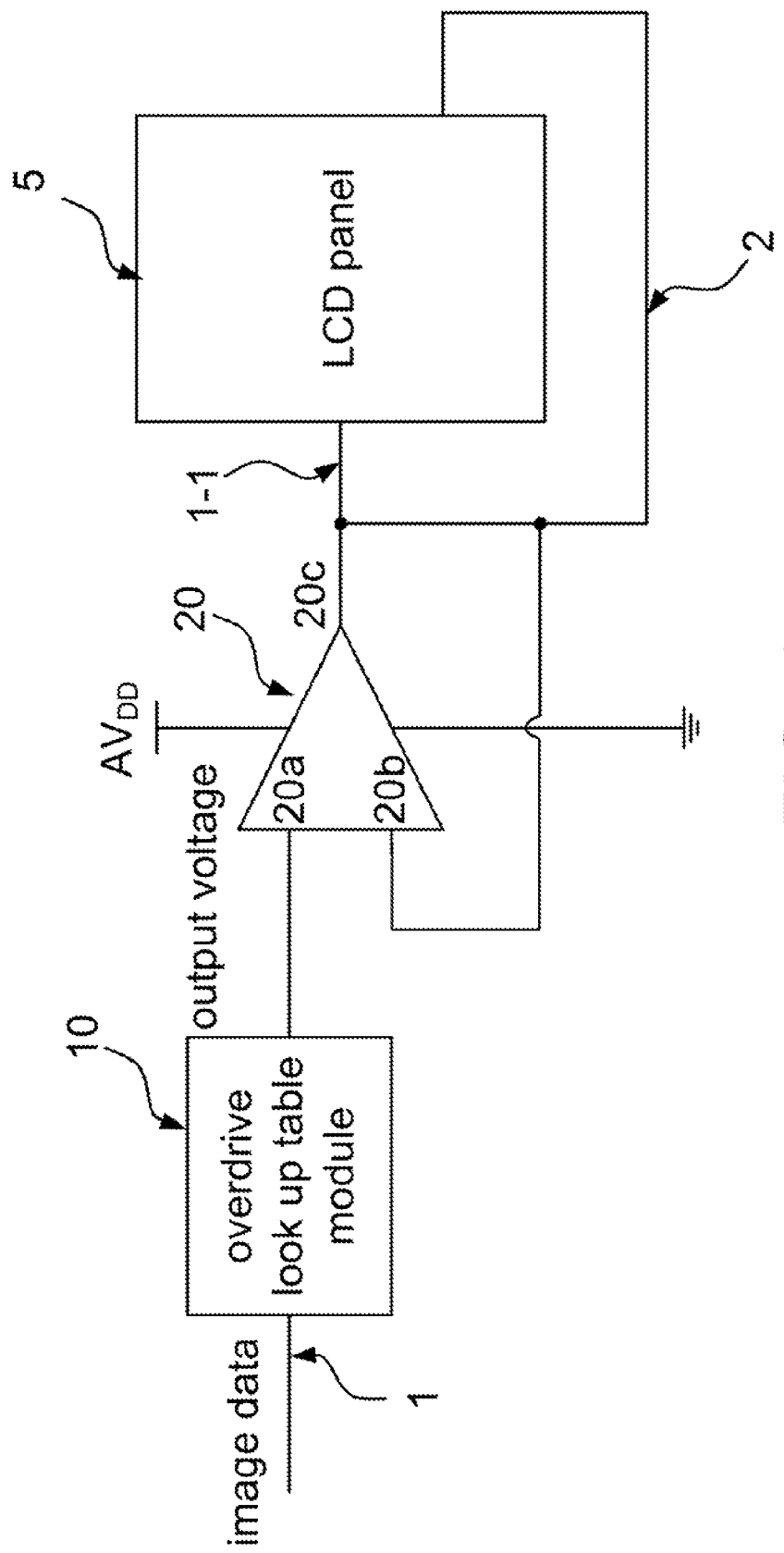
FIG. 1 shows a diagram of connection between a LCD panel and a data line repair apparatus of an embodiment according to the present invention.

For a better understanding the aforementioned content of the present invention, preferable embodiments are illustrated in accordance with the attached figures for further explanation:

Please refer to FIG. 1, which shows a diagram of connection between a LCD panel 5 and an overdrive look up table module 10, a repair operational amplifier 20 of a data line repair apparatus of an embodiment according to the present invention. The data line repair apparatus of the present invention is employed in a LCD panel 5 having a repair line 2. In the embodiment of the present invention, the overdrive look up table module 10 is coupled with a data line 1 of the data line driver (not shown) in the LCD panel 5. The overdrive look up table module 10 is coupled to the LCD panel 5 through the repair operational amplifier 20.

Furthermore, as shown in FIG. 1, the overdrive look up table module 10 is coupled with the data line 1 to receive image data of a present frame transmitted by the data line driver (not shown) in the LCD panel 5. The overdrive look up table module 10 of the data line repair apparatus receives the image data frame by frame (image data of the former frame, image data of the present frame and so on). The LCD panel 5 needs the image data for showing images. Meanwhile, by utilizing the received image data of the present frame and corresponding relationships of image data of a former frame, the image data of the present frame and corresponding output data preserved by the overdrive look up table module 10 of the data line repair apparatus, the overdrive look up table module 10 generates the corresponding output data and outputs a voltage corresponding to the output data. The repair operational amplifier 20 of the data line repair apparatus includes a first input end 20a, a second input end 20b and an output end 20c.

Moreover, as shown in FIG. 1, the first input end 20a of the repair operational amplifier 20 is coupled with the output end of the overdrive look up table module 10 to accept the output voltage from the overdrive look up table module 10. The second input end 20b of the repair operational amplifier 20 is coupled to a data line 1-1 and the repair line 2. The output end 20c of the repair operational amplifier 20 is also coupled to the data line 1-1 and the repair line 2. With the aforementioned connections, the overdrive look up table module 10 outputs the voltage corresponding to the output data to the repair operational amplifier 20 in a scheduled period. After the scheduled period, the overdrive look up table module 10 returns to output a voltage corresponding to the image data of the present frame to the repair operational amplifier 20.

Figure 2:
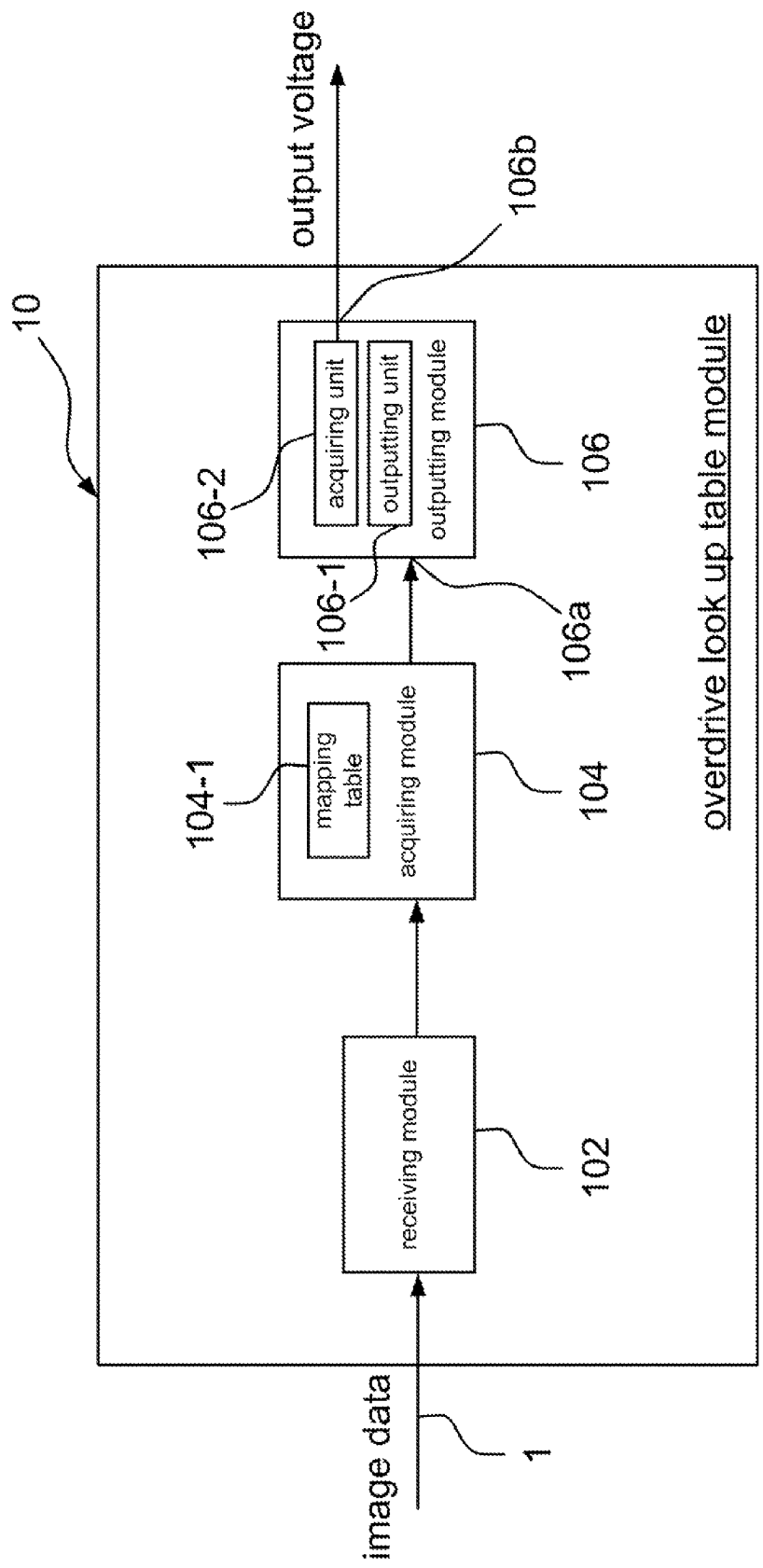
FIG. 2 shows a functional block diagram of an overdrive look up table module of the present invention.

Please refer to FIG. 1 and FIG. 2. FIG. 2 shows a functional block diagram of an overdrive look up table module 10 of the present invention for explaining the detail functions of respective modules and units in the overdrive look up table module 10. The overdrive look up table module 10 of the present invention further comprises a receiving module 102, an acquiring module 104 and an outputting module 106. The overdrive look up table module 10 of the present invention serves as a portion of the data line repair apparatus to apply the overdrive skill in the data line repair apparatus of the present invention. Meanwhile, the acquiring module 104 further comprises a mapping table 104-1 for preserving corresponding relationships of the image data of the former frame, the image data of the present frame and the output data (Detail description is introduced later). The outputting module 106 includes an input end 106a and an output end 106b. The input end 106a is coupled with the acquiring module 104 for receiving the output data. The output end 106b is coupled to the first input end 20a of the repair operational amplifier 20. Moreover, the outputting module 106 further comprises an acquiring unit 106-1 and an outputting unit 106-2. In the embodiment of the present invention, a digital-to-analog converter can be illustrated as a specific implement of the acquiring unit 106-1. A voltage output port can be illustrated as a specific implement of the outputting unit 106-2. The acquiring unit 106-1 transforms the output data acquired by the acquiring module 104 into the voltage corresponding to the output data by a digital-to-analog conversion. The outputting unit 106-2 is employed for outputting the voltage acquired by the acquiring unit 106-1 to the first input end 20a of the repair operational amplifier 20.

Moreover, for applying the overdrive skill, the mapping table 104-1 of the acquiring module 104 preserves the image data (image data of the former frame, image data of the present frame and so on) which the LCD panel 5 needs for showing images. The acquiring module 104 also preserves the corresponding relationships of theses image frames and the output data. With the data constantly inputted from the data line driver of the LCD panel 5, the mapping table 104-1 is accordingly written and updating the contents of the image data of the former frame, image data of the present frame and the corresponding relationships, etcetera. For example, the data preserved in the mapping table 104-1 is: the image data of the former frame is 0000, the image data of the present frame is 1010 and the corresponding output data is 1100; the image data of the former frame is 0000, the image data of the present frame is 0110 and the corresponding output data is 1000. With an assumption that the voltage corresponding to the output data 1111 is 15V, the voltage corresponding to the output data 1100 is 12V and the voltage corresponding to the output data 1010 is 10V. The conversion between the output data and the voltage can utilize well known skills, no further description is introduced here. A memory of the acquiring module 104 can be illustrated for realizing the mapping table 104-1. The content preserved by the mapping table 104-1 can be a database or a look up table saved therein but the present invention does not have any limitation thereto.

Furthermore, the receiving module 102, the acquiring module 104, the outputting module 106 and the mapping table 104-1, the acquiring unit 106-1, the outputting unit 106-2 of the overdrive look up table module 10 can be integrated, such as in an ASIC (application-specific integrated circuit), which has particular customized design for the demands of the LCD panel 5. Specifically, the present invention does not have any limitation thereto. Moreover, The overdrive look up table module 10 serves as a portion of the data line repair apparatus for applying the overdrive skill in the data line repair apparatus of the present invention. The overdrive look up table module 10 and the repair operational amplifier 20 of the data line repair apparatus also can be integrated in an ASIC in advance, which has particular customized design for the demands of the LCD panel 5 for realization. Alternatively, the data line repair apparatus can be incorporated into the original driving circuit module for realization by applying the overdrive skill in the present invention into the circuit design of the data line repair. The present invention has no limitation thereto.

Furthermore, as aforementioned, with the data constantly inputted from the data line driver of the LCD panel 5, the mapping table 104-1 is accordingly written and updated. What the data line driver (not shown) outputs to the input end 1 (the input end of the overdrive look up table module 10) of the receiving module 102 is data. Therefore, after the acquiring module 104 acquired the corresponding output data, the acquiring unit 106-1 of the outputting module 106 has to transform the output data into the voltage corresponding to the output data. Then, the foregoing voltage outputted by the outputting unit 106-2 can be received by the repair operational amplifier 20.

Figure 3:
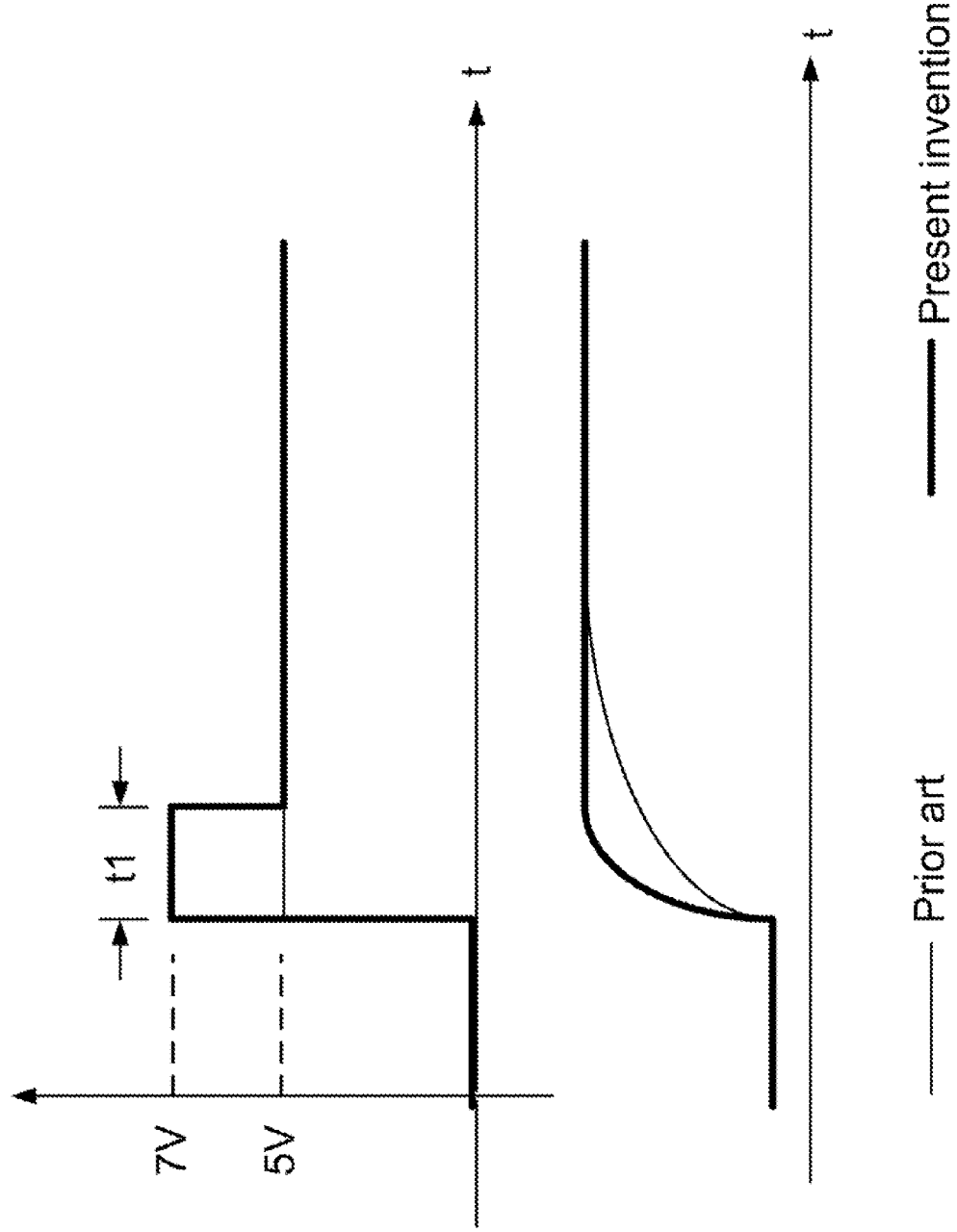
FIG. 3 shows a relation diagram of a voltage inputted to the repair operational amplifier and time, and a curve diagram of a voltage response time at the data terminal for the LCD panel in prior art and the LCD panel utilizing the present invention.

Please refer to FIG. 3, shows a relation diagram of a voltage inputted to the repair operational amplifier and time, and a curve diagram of a voltage response time at the data terminal for the LCD in prior art and the LCD utilizing the present invention. In FIG. 3, the upper portion is the relation diagram of time and the voltage which the overdrive look up table module 10 inputs to the repair operational amplifier 20. The lower portion is curve diagram of the voltage response time at the data line terminal for the LCD panel 5. The fine line represents prior art and the bold line represent the present invention utilizing the overdrive skill.

Furthermore, as shown in the upper portion of FIG. 3, with an assumption that the voltage which the overdrive look up table module 10 inputs to the repair operational amplifier 20 is 5V according to the image data of the present frame. Because the prior art does not utilize the overdrive skill, the voltage inputted to the repair operational amplifier 20 is just 5V. The voltage response time at the data terminal is indicated by the fine line. It takes longer than the scheduled period t1 to reach the predetermined voltage.

The present invention utilizes the overdrive skill. Therefore, as shown in the upper portion of FIG. 3, in case that the mapping table 104-1 of the acquiring module 104 is utilized with looking up the table, and the voltage corresponding to the output data acquired by looking up the table is 7V. The voltage which the overdrive look up table module 10 inputs to the repair operational amplifier 20 is 7V. Then, after the receiving module 102 receives the image data of the present frame from the data line driver of the LCD panel 5, according to the result of looking up the table from the mapping table 104-1, the overdrive look up table module 10 can derive the 7V overdrive voltage, which is transformed by the acquiring unit 106-1 of the outputting module 106. Then, in the scheduled period t1, the outputting unit 106-2 outputs the 7V overdrive voltage to the first input end 20a of the repair operational amplifier 20.

Therefore, as shown in the lower portion of FIG. 3, the LCD panel utilizing the present invention reaches the predetermined voltage without taking the complete scheduled period t1 but before the end of the scheduled period t1. Moreover, the overdrive look up table module 10 returns to output the 5V voltage corresponding to the image data of the present frame to the first input end 20a of the repair operational amplifier 20. Therefore, the voltage response time at the data line terminal of the LCD panel 5 utilizing the present invention can be shortened. Hereby, the voltage response time of the repair line in the LCD panel can be shortened to improve the phenomenon of the uneven display image of the LCD panel.

Figure 4:
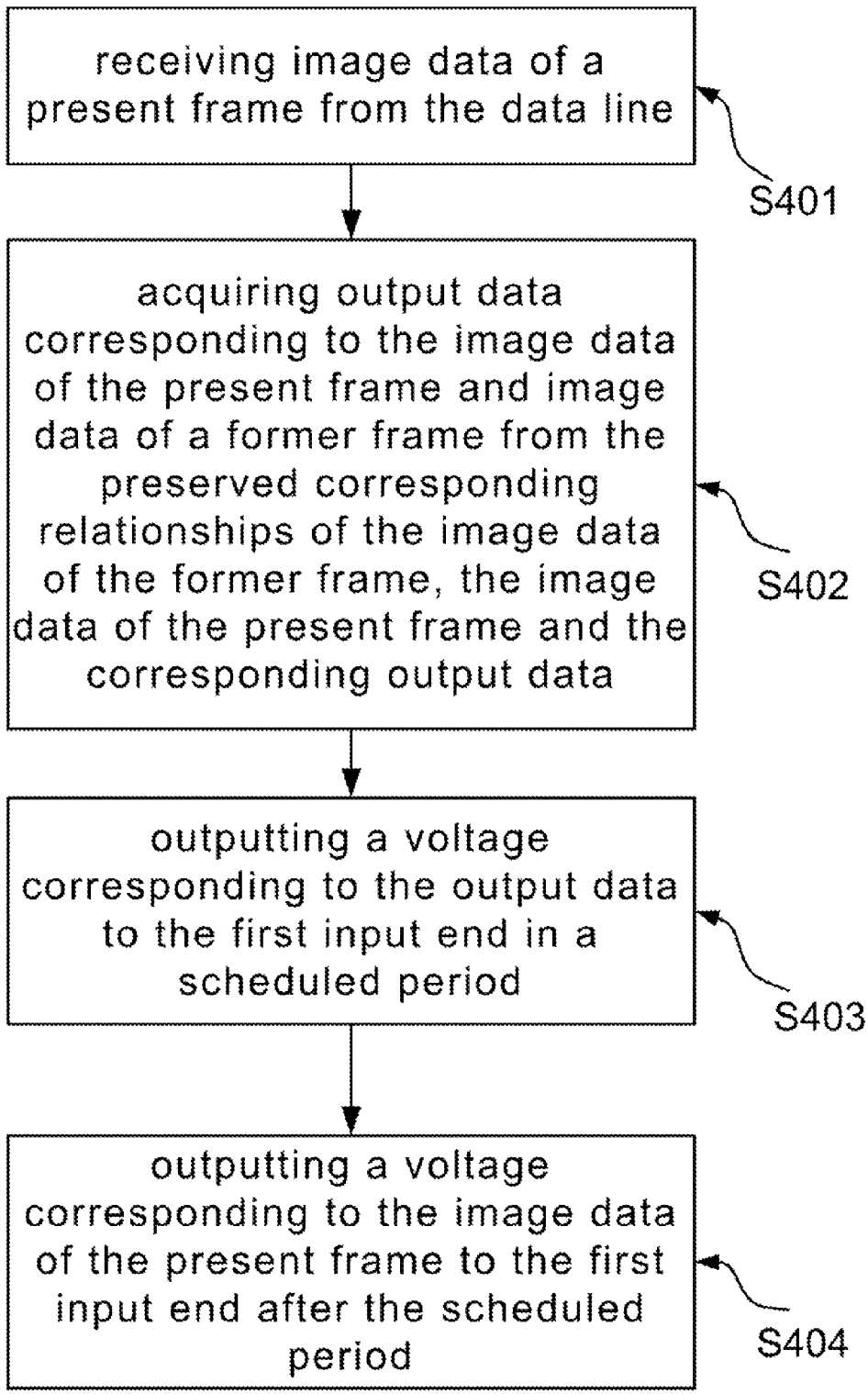
FIG. 4 shows a flowchart of a data line repair method according to the present invention.

Please refer to FIG. 1, FIG. 2 and FIG. 4. FIG. 4 shows a flowchart of a data line repair method according to the present invention. The data line repair method provided by the present invention is utilizing the aforesaid data line repair apparatus employed in a LCD panel 5 having a repair line 2. The repair operational amplifier 20 of the data line repair apparatus according to the present invention includes a first input end 20a, a second input end 20b and an output end 20c. The output end 20c and the second input end 20b are both coupled to a data line 1-1 of the LCD panel 5 and the repair line 2. In other words, the data line 1-1 and the repair line 2 are coupled to the overdrive look up table module 10 through the repair operational amplifier 20. Hereby, the overdrive skill can be applied for driving the data line of the LCD panel 5 and for shortening the voltage response time of the repair line.

The detail description of the data line repair method according to the present invention is introduced below:

Step S401, receiving image data of a present frame from the data line 1;

Step S402, acquiring output data corresponding to the image data of the present frame and image data of a former frame from the preserved corresponding relationships of the image data of the former frame, the image data of the present frame and the corresponding output data;

Step S403, outputting a voltage corresponding to the output data to the first input end 20a in a scheduled period;

Step S404, outputting a voltage corresponding to the image data of the present frame to the first input end 20a after the scheduled period.

Specifically, in Step S401, the receiving module 102 receives the image data of the present frame from the data line. In Step S402, the acquiring module 103 acquires the necessary corresponding output data from the corresponding relationships of image data of a former frame, the image data of the present frame and output data preserved in the mapping table 104-1. Next, the acquiring module 104 transmits the corresponding output data to the outputting module 106 through the input end 106a of the outputting module 106. In Step S403, the acquiring unit 106-1 of the outputting module 106 transforms the output data from the acquiring module 104 into the voltage corresponding to the output data, i.e. the overdrive voltage. In the scheduled period, the outputting unit 106-2 of the outputting module 106 outputs the 7V overdrive voltage shown in FIG. 3, to the first input end 20a of the repair operational amplifier 20. And in Step S404, after the scheduled period (such as the period t1 shown in FIG. 3), the voltage level at the data terminal reaches the predetermined voltage, the outputting unit 106-2 of the outputting module 106 returns to output the 5V voltage corresponding to the image data of the present frame to the first input end 20a of the repair operational amplifier 20.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A data line repair apparatus, employed in a LCD panel having a repair line, wherein the data line repair apparatus comprises:
   a repair operational amplifier, including a first input end, a second input end and an output end, the output end and the second input end are both coupled to a data line of the LCD panel and the repair line; and
   an overdrive look up table module, comprising:
      a receiving module, receiving image data of a present frame from the data line;
      an acquiring module, having a mapping table for preserving corresponding relationships of image data of a former frame, the image data of the present frame and output data, and the acquiring module acquires output data corresponding to the image data of the present frame and the image data of the former frame; and
      an outputting module, outputting a voltage corresponding to the output data to the first input end of the repair operational amplifier in a scheduled period; outputting a voltage corresponding to the image data of the present frame to the first input end of the repair operational amplifier after the scheduled period.

2. The data line repair apparatus of claim 1, wherein the outputting module further comprises:
   an acquiring unit, acquiring the corresponding voltage by a digital-to-analog conversion; and
   an outputting unit, outputting the corresponding voltage acquired by the acquiring unit to the first input end of the repair operational amplifier in the scheduled period.

3. The data line repair apparatus of claim 1, wherein the outputting module further comprises:
   an acquiring unit, acquiring the corresponding voltage by a digital-to-analog conversion; and
   an outputting unit, outputting the corresponding voltage acquired by the acquiring unit to the first input end of the repair operational amplifier after the scheduled period.

4. A data line repair apparatus, employed in a LCD panel having a repair line, and the data line repair apparatus comprises a repair operational amplifier including a first input end, a second input end and an output end, and the output end and the second input end are both coupled to a data line of the LCD panel and the repair line, wherein the data line repair apparatus comprises:
   a receiving module, receiving image data of a present frame from the data line;
   an acquiring module, acquiring output data corresponding to the image data of the present frame and image data of a former frame from preserved corresponding relationships of the image data of the former frame, the image data of the present frame and the corresponding output data; and
   an outputting module, outputting a voltage corresponding to the output data acquired by the acquiring module to the first input end in a scheduled period.

5. The data line repair apparatus of claim 4, wherein the outputting module outputs a voltage corresponding to the image data of the present frame to the first input end of the repair operational amplifier after the scheduled period.

6. The data line repair apparatus of claim 4, wherein the acquiring module further comprises a mapping table for preserving corresponding relationships of the image data of the former frame, the image data of the present frame and the corresponding output data.

7. The data line repair apparatus of claim 4, wherein the outputting module further comprises:
   an acquiring unit, acquiring a voltage corresponding to the image data of the present frame by a digital-to-analog conversion; and
   an outputting unit, outputting the voltage acquired by the acquiring unit to the first input end of the repair operational amplifier after the scheduled period.

8. The data line repair apparatus of claim 4, wherein the receiving module, the acquiring module and the outputting module are integrated in an overdrive look up table module.

9. The data line repair apparatus of claim 8, wherein the overdrive look up table module and the repair operational amplifier are integrated in an integrated circuit.

10. A data line repair method, employed in a LCD panel having a repair line, and a repair operational amplifier coupled to the LCD panel including a first input end, a second input end and an output end, and the output end and the second input end are both coupled to a data line of the LCD panel and the repair line, wherein the data line repair method comprises steps of:
   receiving image data of a present frame from the data line;
   acquiring output data corresponding to the image data of the present frame and image data of a former frame from preserved corresponding relationships of the image data of the former frame, the image data of the present frame and the corresponding output data; and
   outputting a voltage corresponding to the output data to the first input end in a scheduled period.

11. The data line repair method of claim 10, further comprising steps of:
   acquiring the corresponding voltage by a digital-to-analog conversion; and
   outputting the corresponding voltage acquired with the digital-to-analog conversion to the first input end of the repair operational amplifier in the scheduled period during the step of outputting the voltage corresponding to the output data to the first input end.

12. The data line repair method of claim 10, wherein the corresponding relationships of the image data of the former frame, the image data of the present frame and the corresponding output data are preserved in a mapping table.

13. The data line repair method of claim 10, further comprising step of:
   outputting a voltage corresponding to the image data of the present frame to the first input end after the scheduled period.

14. The data line repair method of claim 13, the corresponding relationships of the image data of the former frame, the image data of the present frame and the corresponding output data are preserved in a mapping table.

15. The data line repair method of claim 13, further comprising steps of:
   acquiring the voltage corresponding to the image data of the present frame by a digital-to-analog conversion; and outputting the voltage acquired with the digital-to-analog conversion to the first input end of the repair operational amplifier after the scheduled period during the step of outputting the voltage corresponding to the image data of the present frame to the first input end after the scheduled period.

* * * * *